United States Patent
Chen et al.

(10) Patent No.: US 11,393,076 B2
(45) Date of Patent: Jul. 19, 2022

(54) BLURRING PANORAMIC IMAGE BLURRING METHOD, TERMINAL AND COMPUTER READABLE STORAGE MEDIUM

(71) Applicant: ArcSoft Corporation Limited, Zhejiang (CN)

(72) Inventors: Kai Chen, Zhejiang (CN); Hua Lei, Zhejiang (CN); Lizhen Wang, Zhejiang (CN)

(73) Assignee: ArcSoft Corporation Limited, Hangzhou (CN)

( * ) Notice: Subject to any disclaimer, the term of this patent is extended or adjusted under 35 U.S.C. 154(b) by 327 days.

(21) Appl. No.: 16/289,684

(22) Filed: Mar. 1, 2019

(65) Prior Publication Data
US 2019/0287223 A1    Sep. 19, 2019

(30) Foreign Application Priority Data
Mar. 14, 2018    (CN) .......................... 201810209447.8

(51) Int. Cl.
*G06T 5/00*    (2006.01)
*H04N 5/232*    (2006.01)

(52) U.S. Cl.
CPC ......... *G06T 5/003* (2013.01); *H04N 5/23238* (2013.01); *G06T 2207/10028* (2013.01)

(58) Field of Classification Search
CPC ...... G06T 5/003; G06T 5/004; H04N 5/23238
See application file for complete search history.

(56) References Cited

U.S. PATENT DOCUMENTS

| | | | |
|---|---|---|---|
| 9,292,926 B1* | 3/2016 | Tang | G06V 10/60 |
| 9,412,151 B2* | 8/2016 | Ishii | G06T 5/003 |
| 9,424,650 B2* | 8/2016 | van Baar | G01S 17/86 |
| 9,998,666 B2* | 6/2018 | Sapiro | H04N 5/23258 |
| 10,008,027 B1* | 6/2018 | Baker | G06T 7/50 |

(Continued)

FOREIGN PATENT DOCUMENTS

| | | | |
|---|---|---|---|
| CN | 102729902 A | | 10/2012 |
| CN | 105100615 A | | 11/2015 |

(Continued)

*Primary Examiner* — Mia M Thomas
(74) *Attorney, Agent, or Firm* — Gang Yu (57) ABSTRACT

A panoramic image blurring method, a terminal and a computer readable storage medium are provided. A main technical solution is to synthesize a panoramic image having blurring effect in combination with a panoramic stitching technology and a double-camera configuration. Photographs the images of a scene from the multiple angles of view with a double-camera component, and the images from the angles of view may have a certain overlap area. Subsequently, the scene images and scene depth images from these angles of view may be spliced with the panoramic stitching technology, to obtain a full-scene image and a full-scene depth image of a wide-viewing angle. In this way, a panoramic scene image having the blurring effect may be rendered subsequently. Through a solution in the embodiment, the panoramic image having the blurring effect may be acquired, the panoramic photographing may achieve an effect of simulating large-aperture imaging of a professional camera, and a better impression of a photo may be brought.

16 Claims, 3 Drawing Sheets

(56) References Cited

U.S. PATENT DOCUMENTS

| | | | |
|---|---|---|---|
| 10,430,994 B1* | 10/2019 | Baker | G06T 7/593 |
| 10,620,505 B2* | 4/2020 | Naiyang | G06T 7/11 |
| 10,645,294 B1* | 5/2020 | Manzari | H04N 5/232945 |
| 10,708,499 B2* | 7/2020 | Naiyang | G03B 13/36 |
| 10,726,580 B2* | 7/2020 | Zhou | G06T 7/80 |
| 10,740,876 B1* | 8/2020 | Lanman | G02B 27/017 |
| 10,764,496 B2* | 9/2020 | Chen | G06T 5/50 |
| 10,803,556 B2* | 10/2020 | Lin | H04N 5/2258 |
| 10,810,718 B2* | 10/2020 | Zhou | G06T 5/50 |
| 10,872,420 B2* | 12/2020 | Shukla | G06N 3/02 |
| 11,127,119 B1* | 9/2021 | Slutsky | G06T 5/50 |
| 2009/0245696 A1* | 10/2009 | Yuan | H04N 5/2226 382/312 |
| 2012/0038751 A1* | 2/2012 | Yuan | H04N 5/23232 348/51 |
| 2013/0063566 A1* | 3/2013 | Morgan-Mar | G06T 7/571 348/46 |
| 2013/0266210 A1* | 10/2013 | Morgan-Mar | G06T 7/571 382/154 |
| 2014/0184640 A1 | 7/2014 | Putraya et al. | |
| 2014/0267602 A1* | 9/2014 | Tzur | H04N 13/122 348/43 |
| 2014/0368615 A1* | 12/2014 | van Baar | G01S 17/86 348/48 |
| 2015/0071362 A1* | 3/2015 | Uchiumi | H04N 19/597 375/240.26 |
| 2015/0147000 A1* | 5/2015 | Salvador Marcos | H04N 5/2628 382/284 |
| 2015/0178935 A1* | 6/2015 | Morgan-Mar | G06T 7/571 382/154 |
| 2015/0235103 A1* | 8/2015 | Komatsu | G06T 7/593 382/195 |
| 2015/0356738 A1* | 12/2015 | Yoon | H04N 13/243 348/47 |
| 2016/0050407 A1* | 2/2016 | Chen | H04N 13/204 348/47 |
| 2016/0300338 A1* | 10/2016 | Zafar | G06K 9/6201 |
| 2017/0064204 A1* | 3/2017 | Sapiro | G06T 5/50 |
| 2018/0268099 A1* | 9/2018 | Katzir | G06F 30/398 |
| 2018/0343431 A1* | 11/2018 | Veldandi | H04N 13/207 |
| 2019/0066290 A1* | 2/2019 | Shaubi | G06K 9/6269 |
| 2019/0079022 A1* | 3/2019 | Shabtay | G06T 7/0004 |
| 2019/0096053 A1* | 3/2019 | Asbag | G06K 9/6281 |
| 2019/0287223 A1* | 9/2019 | Chen | H04N 5/2258 |
| 2019/0333208 A1* | 10/2019 | Asbag | G06K 9/6256 |
| 2019/0364206 A1* | 11/2019 | Dal Mutto | G06T 7/85 |
| 2020/0051206 A1* | 2/2020 | Munkberg | G06T 1/20 |
| 2020/0226743 A1* | 7/2020 | Savchenko | G06T 7/0004 |
| 2020/0226744 A1* | 7/2020 | Cohen | G06T 7/11 |
| 2020/0234417 A1* | 7/2020 | Cohen | G06T 7/001 |
| 2020/0242788 A1* | 7/2020 | Jacobs | G06T 7/50 |
| 2021/0004962 A1* | 1/2021 | Tsai | G06K 9/726 |
| 2021/0029336 A1* | 1/2021 | Liu | H04N 9/646 |
| 2021/0056668 A1* | 2/2021 | Barnes | G06T 7/30 |
| 2021/0258483 A1* | 8/2021 | Xiao | H04N 5/2258 |
| 2021/0321047 A1* | 10/2021 | Abbas | H04N 5/247 |

FOREIGN PATENT DOCUMENTS

| | | |
|---|---|---|
| CN | 106651755 A | 5/2017 |
| CN | 107230187 A | 10/2017 |
| CN | 107635093 A | 1/2018 |
| CN | 107644392 A | 1/2018 |

* cited by examiner

| S201 | A photographer holds a photographing apparatus to revolve during photographing. When the photographing apparatus revolves, multiple main images and multiple auxiliary images are photographed by dual cameras from multiple angles of view. Herein, a main camera photographs the main image, and an auxiliary camera photographs the auxiliary image |

A scene depth map of the main image from each angle of view is calculated in accordance with the main image and the auxiliary image from the each angle of view  / S202

A geometric transformation relation between the main images from the each angle of view is calculated by implementing image registration for the main images from the multiple angles of view, to acquire image registration data  / S203

A full-scene main image is acquired by splicing the multiple main images in accordance with the image registration data  / S204

A corresponding gradient map is calculated in accordance with the scene depth map of the main image from the each angle of view, a full-scene depth gradient map is acquired by splicing the scene depth maps of the main images from the multiple angles of view in accordance with the image registration data, and the full-scene depth map having a consistent depth value of the overlap area is restored from the full-scene depth gradient map in accordance with a Poisson fusion constraint equation  / S205

A focus point is selected in accordance with the full-scene main image obtained after splicing and the full-scene depth map obtained after Poisson fusion of the full-scene main image, a difference between the depth value of each pixel in an area except the focus point on the full-scene main image and the depth value of the focus point is calculated in accordance with the full-scene depth map of the full-scene main image, a blurriness of the each area on the full-scene main image is calculated in accordance with the difference, and the corresponding area on the full-scene main image is subjected to blurring in accordance with the blurriness of the each area to generate a panoramic image having blurring effect  / S206

BLURRING PANORAMIC IMAGE BLURRING METHOD, TERMINAL AND COMPUTER READABLE STORAGE MEDIUM

TECHNICAL FIELD

The embodiments of the disclosure relates to an image processing technology, in particular to a panoramic image blurring method, a terminal and a computer readable storage medium.

BACKGROUND

In recent years, a function of a smart terminal (such as a smart phone) has become increasingly powerful in an aspect of photographing, and a photographing effect has been constantly approaching a professional photographing apparatus. For example, a dual-camera design in the smart phone is an important development of a photographing technology of the smart phone in recent years. Herein, a blurring effect is a main application of dual cameras of the phone. A current terminal only implements blurring on a single image from a narrow angle of view based on the information of dual cameras, and blurring of a panoramic image has not been realized yet.

SUMMARY

In order to solve the mentioned technical problem, the embodiments of the disclosure provides a panoramic image blurring method, a terminal and a computer readable storage medium. With the embodiments of the disclosure, a panoramic image having blurring effect may be acquired, panoramic photographing may achieve an effect of simulating a large-aperture imaging of a professional camera, and accordingly a better impression of a photo may be brought.

In order to achieve the mentioned objective of the embodiments of the disclosure, a panoramic image blurring method is provided. The method includes:

Scene depth information of multiple main images is calculated in accordance with the multiple main images and multiple auxiliary images which are photographed by dual cameras from multiple angles of view.

Image registration data is calculated in accordance with the multiple main images, and the scene depth information of the each main image is acquired.

A full-scene main image is acquired by splicing the multiple main images in accordance with the image registration data, and the scene depth information of the full-scene main image is determined in accordance with the image registration data and the scene depth information of the each main image.

The full-scene main image is subjected to blurring in accordance with the scene depth information of the full-scene main image and a selected focus point to obtain a panoramic image having blurring effect.

A terminal includes a processor and a computer readable storage medium. Instructions are stored in the computer readable storage medium. The mentioned blurring panoramic image blurring method is implemented when the instructions are executed by the processor.

A computer readable storage medium is characterized in that a computer program is stored thereon. The mentioned panoramic image blurring method is implemented when the computer program is executed by the processor.

The embodiments of the disclosure includes: the scene depth information of the multiple main images are calculated in accordance with the multiple main images and the multiple auxiliary images which are photographed by the dual cameras from multiple angles of view. The image registration data is calculated in accordance with the multiple main images, and the scene depth information of the each main image is acquired. The full-scene main image is acquired by splicing the multiple main images in accordance with the image registration data, and the scene depth information of the full-scene main image is determined in accordance with the image registration data and the scene depth information of the each main image. The full-scene main image is subjected to the blurring in accordance with the scene depth information of the full-scene main image and the selected focus point, to obtain the panoramic image having the blurring effect. Through a solution in the embodiment, the panoramic image having the blurring effect may be acquired, the panoramic photographing may achieve the effect of simulating large-aperture imaging of a professional camera, and the better impression of the photo may be brought.

Other characteristics and advantages of the embodiments of the disclosure shall be stated in the subsequent description, and would become apparent in the description partially, or would be known through implementation of the embodiments of the disclosure. The objectives and other advantages of the embodiments of the disclosure may be implemented and acquired by structures which are specially pointed out in the description, claims and drawings.

BRIEF DESCRIPTION OF THE DRAWINGS

The accompanying drawings are used to provide further understanding of the technical solution of the embodiments of the disclosure, and are part of the description. The drawings are used jointly with the embodiments of the application to explain the technical solution of the embodiments of the disclosure rather than limit the technical solution of the embodiments of the disclosure.

DETAILED DESCRIPTION OF THE EMBODIMENTS

In order to make the objective, the technical solution and advantages of the embodiments of the disclosure more clearly, the embodiments of the disclosure will be described below in combination of drawings in detail. It is to be noted that the embodiments and characteristics in the application may be randomly combined with each other in the embodiments on the premise that no conflict occurs.

Steps that are shown in a flowchart of a drawing may be implemented in a computer system, for example, capable of executing a group of computer executable instructions. In addition, although the flowchart shows a logic order, the shown or described steps may be implemented with an order which is different from the logic order under some circumstances.

Figure 1:
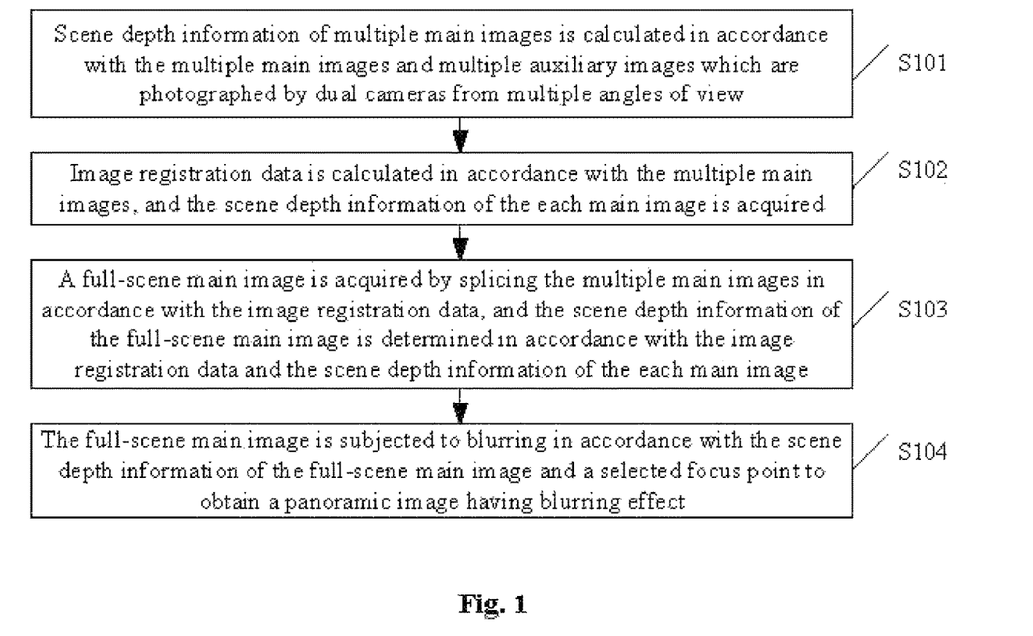
FIG. 1 is a flowchart of a panoramic image blurring method according to an embodiment of the disclosure.

As shown in FIG. 1, a panoramic image blurring method includes steps S101-104.

S101, scene depth information of multiple main images is calculated in accordance with the multiple main images and multiple auxiliary images which are photographed by dual cameras from multiple angles of view.

In the embodiment of the disclosure, a main technical solution is to synthesize a panoramic image having blurring effect in combination with a panoramic stitching technology and a double-camera configuration. The embodiment of the disclosure photographs the images of a scene from the multiple angles of view with a double-camera component, and the images from the angles of view may have a certain overlap area. Subsequently, the scene images and scene depth images from these angles of view may be spliced with the panoramic stitching technology, to obtain a full-scene image and a full-scene depth image of a wide-viewing angle. In this way, a panoramic scene image having the blurring effect may be rendered subsequently.

In the embodiments of the disclosure, the dual cameras may include a main camera and an auxiliary camera.

The method further includes: from the each angle of view, the main camera photographs the main image, and the auxiliary camera photographs the auxiliary image.

In the embodiments of the disclosure, two cameras in the double-camera configuration include the main camera and the auxiliary camera. Herein, the image photographed by the main camera is the main image of the scene, and the image photographed by the auxiliary camera is the auxiliary image of the scene. The double-camera configuration in the solution is not limited, and may be defined by a user in accordance with different application scenes or requirements. For example, the double-camera configuration may be the configuration of a color camera and another color camera, or a color camera and a black-and-white camera, or a wide-angle camera and a telephoto camera, and so on.

Figure 2:
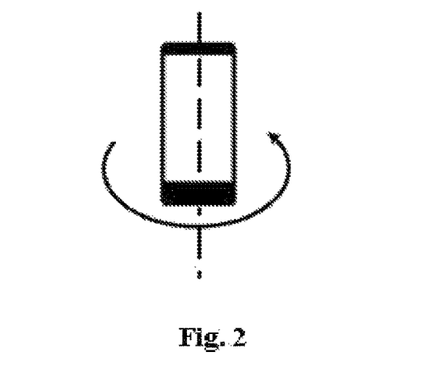
FIG. 2 is a schematic diagram of a photographing apparatus revolving around a center of the apparatus according to an embodiment of the disclosure.

In the embodiments of the disclosure, a photographer may make a photographing apparatus revolve around a center of the apparatus during photographing. As shown in FIG. 2, the images of a current scene are photographed from the multiple angles of view of the camera, namely the main images and the auxiliary images from the all angles of view. Herein, the images photographed from adjacent angles of view should have the certain overlap area. In addition, revolving of the photographing apparatus may be controlled by the photographer with hands, or controlled by a motor. For example, the photographing apparatus (such as a cell phone) may be fixed on a rotatable platform, and the platform may be controlled to rotate with the motor. In this way, the photographing apparatus may be driven to revolve with the platform.

In the embodiments of the disclosure, the method further includes: a revolving angle of the photographing apparatus between two adjacent angles of view may be kept to be less than a field of view (FOV) of the camera in a horizontal direction when photographing the multiple main images and the multiple auxiliary images with the dual cameras from the multiple angles of view.

In the embodiments of the disclosure, in order to ensure that the images photographed from the adjacent angles of view have the certain overlap area, a photographing control unit shall meet the following operations: the FOV of the camera in the horizontal direction is set to $\theta$, and a revolving angle $\theta_p$ of the camera between two adjacent angles of view should be less than $\theta$, to ensure that the images from the all angles of view have the certain overlap area. Herein, the revolving angle of the photographing apparatus may be recorded by a gyro of the apparatus, and a revolving angle $\theta_p$ of the camera between two adjacent angles of view shall be set in advance in accordance with the FOV $\theta$ of the photographing apparatus and a required size of the overhead area of the camera. During photographing, when a photographing angle recorded by the gyro is changed for $\theta_p$ compared with a last photographing angle, the photographing apparatus may photograph the main image and the auxiliary image of the current scene. Alternatively, the scene images at all moments may be recorded when the photographing apparatus revolves, a revolving path of the photographing apparatus may be calculated with a way of tracing a characteristic point, and an appropriate image may be selected therefrom in accordance with requirements of the revolving angle $\theta_p$.

S102, image registration data is calculated in accordance with the multiple main images, and the scene depth information of the each main image is acquired.

In the embodiments of the disclosure, the main images from the multiple angles of view may be subjected to image registration when the main images and the auxiliary images of the scene are acquired, and accordingly the image registration data is calculated in accordance with the multiple main images.

In the embodiments of the disclosure, the step that the image registration data is calculated in accordance with the multiple main images may include the following steps.

An invariant feature point of the main image from the each angle of view is extracted.

The invariant feature points of the main images from different angles of view are matched.

A geometric transformation matrix of the main image from the each angle of view is calculated by making use of the invariant feature points that match with each other.

The geometric transformation matrix is taken as the image registration data.

In the embodiments of the disclosure, when the main image and the auxiliary image of the scene are acquired, the scene depth information of the main image from the each angle of view may be calculated as well in accordance with the main image and the auxiliary image from the each angle of view. The scene depth information may be a scene depth map, a scene depth array or a self-defined structure as long as an information representation form of a depth value of the main image from the each angle of view may be recorded. In the embodiments of the disclosure, the scene depth information of the main image from the each angle of view may be indicated with the scene depth map.

In the embodiments of the disclosure, a gray value of each pixel in the scene depth map records a distance from the scene represented by each of the corresponding pixels on the main image to the camera.

S103, a full-scene main image is acquired by splicing the multiple main images in accordance with the image registration data, and the scene depth information of the full-scene main image is determined in accordance with the image registration data and the scene depth information of the each main image.

In the embodiments of the disclosure, projecting transformation, seamless fusion and other operations may be implemented for the multiple main images photographed by the main camera from the all angles of view by making use of a image registration relationship (namely the image registration data) between all scene images from the all angles of view which are calculated in the mentioned steps, to splice the images and to accordingly obtain the full-scene main image.

In the embodiments of the disclosure, the scene depth information of the multiple main images is indicated with the multiple scene depth maps.

The step that the scene depth information of the full-scene main image is determined in accordance with the image registration data and the scene depth information of the each main image may include the following steps.

The full-scene depth map is acquired by splicing the scene depth maps of the multiple main images or splicing gradient maps of the scene depth maps of the main images in accordance with the image registration data. The full-scene depth map is taken as the scene depth information of the full-scene main image.

Figure 3:
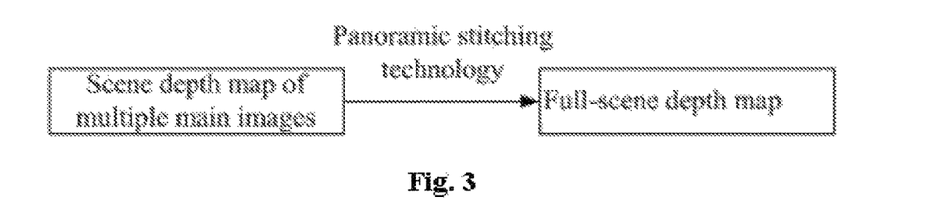
FIG. 3 is a schematic diagram of a method of obtaining a panoramic depth map by directly splicing scene depth maps of multiple main images according to an embodiment of the disclosure.
Figure 4:
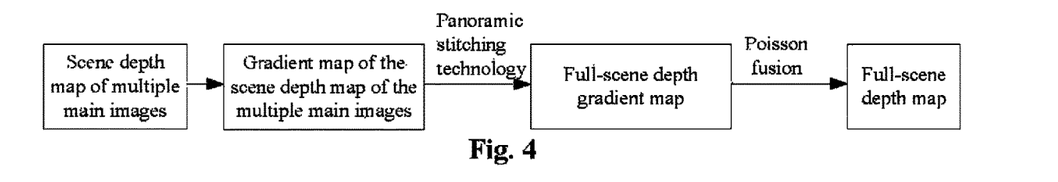
FIG. 4 is a schematic diagram of a method of obtaining a full-scene depth map having a consistent depth value in an overlap area by splicing gradient maps of scene depth maps of a main image according to an embodiment of the disclosure.

In the embodiments of the disclosure, one panoramic depth map may be obtained by directly splicing the scene depth maps of the multiple main images, as shown in FIG. 3. However, the camera has a certain displacement between the all angles of view during photographing, thereby making the depth values of the overlap area from the angles of view of two adjacent cameras different from each other, namely the depth values of an identical spatial point calculated from two different angles of view are different. Therefore, final blurring effect may be undesirable due to the solution of obtaining one panoramic depth map by directly splicing the scene depth maps of the multiple main images. In order to solve the problem, the embodiments of the disclosure splices the gradient maps of the scene depth maps of the main images, to obtain the full-scene depth map having the consistent depth value in the overlap area, as shown in FIG. 4.

In the embodiments of the disclosure, the gradient map of the depth map indicates change information of the depth map. The greater a gradient value is, the greater a depth change of a location would be.

In the embodiments of the disclosure, the step that the full-scene depth map is acquired by splicing the gradient maps of the scene depth maps of the main images may include the following steps.

Acquiring a full-scene depth gradient map by splicing the gradient maps of the scene depth maps of the main images from the multiple angles of view in accordance with the image registration data, and the full-scene depth map is acquired in accordance with the full-scene depth gradient map. Herein, the gradient map of the scene depth map of the main image from the each angle of view is acquired in accordance with the scene depth map of the corresponding main image.

In the embodiments of the disclosure, the corresponding gradient map may be calculated first in accordance with the scene depth map of the main image from the each angle of view, the full-scene depth gradient map may be acquired by splicing the gradient maps from the multiple angles of view in accordance with the image registration data, and the full-scene depth map may be acquired in accordance with the full-scene depth gradient map.

In the embodiments of the disclosure, the step that the full-scene depth map may be acquired in accordance with the full-scene depth gradient map includes: the full-scene depth map may be acquired by a preset Poisson fusion constraint equation.

In the embodiments of the disclosure, when the full-scene depth map is acquired, the full-scene having the consistent depth value in the overlap area may be acquired by solving the following Poisson fusion constraint equation:

$$\min_f \int\int_\Omega \|\nabla f - v\|^2 \text{ with } f\,|_{\partial\Omega} = f^*\,|_{\partial\Omega}$$

Herein, "$\|\ \|$" indicates L2-norm which is used to measure a difference between two variables; f is the full-scene depth map to be solved; $\nabla f$ is the gradient map of the full-scene depth map to be solved; v is the full-scene depth gradient map obtained by the mentioned splicing; $\Omega$ is a splicing area of the image; and $\partial\Omega$ is an edge of the splicing area of the image.

In the embodiments of the disclosure, the equation indicates that the rest of the image is solved on the premise that a pixel value of the edge of the image is kept still, thereby making the gradient map of the whole image be as close to the gradient map of an original image as possible, namely, obtaining v (the full-scene depth gradient map) by splicing. It is hoped that the f (the full-scene depth map) is solved from the v. Meanwhile, it is hoped that the f may meet the following property: the gradient map $\nabla f$ of f may be as close to the v as possible.

In the embodiments of the disclosure, the way of acquiring the full-scene depth map includes, but is not limited to, the solution of splicing the scene depth maps of the mentioned multiple main images and splicing the gradient maps of the scene depth maps of the main images. Meanwhile, other ways may be taken to implement as well. For example, the depth map of the full-scene main image, namely the full-scene depth map, may be restored by taking the spliced full-scene main image, by deep learning and other methods.

S104, the full-scene main image is subjected to blurring in accordance with the scene depth information of the full-scene main image and a selected focus point to obtain the panoramic image having the blurring effect.

In the embodiments of the disclosure, the focus point is selected in accordance with the full-scene main image obtained after splicing and the scene depth information of the full-scene main image, such as the mentioned full-scene depth map, and a blurriness of different areas of the image is calculated in accordance with the depth value of the each pixel in the full-scene main image, to obtain the full-scene image having the blurring effect.

In the embodiments of the disclosure, a location of the focus point must first be specified in the full-scene main image that needs to be blurred. In the embodiments of the disclosure, the method further includes: the focus point is selected on the full-scene main image through any one of the following ways.

The focus point is determined through manual selection of the user.

A human face is detected by making use of a human face detection technology, and a location of the human face is taken as the focus point.

A target that a human eye is interested in is calculated by making use of a visual saliency detection algorithm, and a location of the target that the human eye is interested in is taken as the focus point.

In the embodiments of the disclosure, the step that the full-scene main image is subjected to blurring in accordance with the scene depth information of the full-scene main image and the selected focus point to obtain the panoramic image having the blurring effect may include the following steps.

A difference between the depth value of the each pixel in the area except the focus point on the full-scene main image and the depth value of the focus point is calculated in accordance with the full-scene depth map.

The blurriness of the each area on the full-scene main image is calculated in accordance with the difference.

The corresponding area on the full-scene main image is subjected to blurring in accordance with the blurriness of the each area, to generate the panoramic image having the blurring effect.

Figure 5:
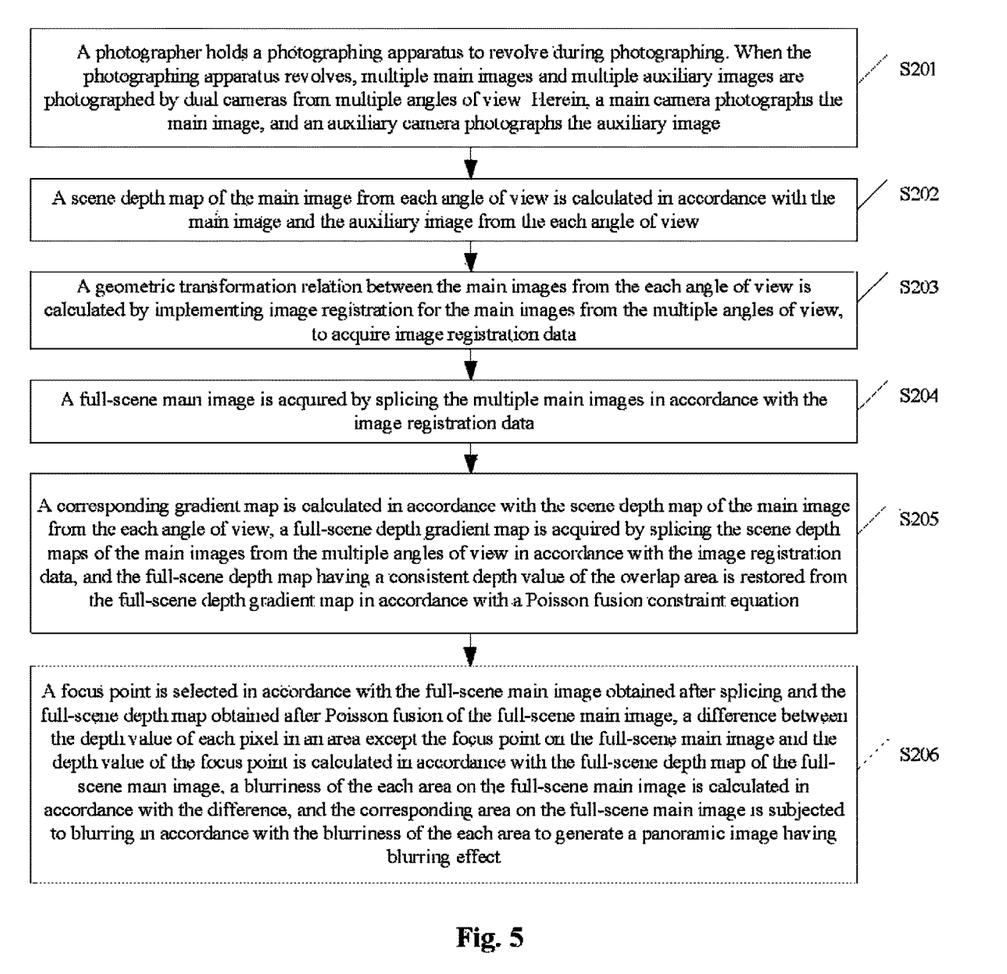
FIG. 5 is a flowchart of a first complete embodiment solution of a panoramic image blurring method according to an embodiment of the disclosure.

In the embodiments of the disclosure, a first complete embodiment solution of the mentioned panoramic image blurring method is shown below. As shown in FIG. 5, the panoramic image blurring method includes steps S201-S206.

S201, a photographer holds a photographing apparatus to revolve during photographing. When the photographing apparatus revolves, multiple main images and multiple auxiliary images are photographed by dual cameras from multiple angles of view. Herein, a main camera photographs the main image, and an auxiliary camera photographs the auxiliary image.

S202, a scene depth map of the main image from each angle of view is calculated in accordance with the main image and the auxiliary image from the each angle of view.

S203, a geometric transformation relation between the main images from the each angle of view is calculated by implementing image registration for the main images from the multiple angles of view, to acquire image registration data.

S204, a full-scene main image is acquired by splicing the multiple main images in accordance with the image registration data.

S205, a corresponding gradient map is calculated in accordance with the scene depth map of the main image from the each angle of view, a full-scene depth gradient map is acquired by splicing the scene depth maps of the main images from the multiple angles of view in accordance with the image registration data, and the full-scene depth map having a consistent depth value in the overlap area is restored from the full-scene depth gradient map in accordance with a Poisson fusion constraint equation.

S206, a focus point is selected in accordance with the full-scene main image obtained after splicing and the full-scene depth map obtained after Poisson fusion, a difference between the depth value of each pixel in an area except the focus point on the full-scene main image and the depth value of the focus point is calculated in accordance with the full-scene depth map, a blurriness of the each area on the full-scene main image is calculated in accordance with the difference, and the corresponding area on the full-scene main image is subjected to blurring in accordance with the blurriness of the each area, to generate a panoramic image having blurring effect.

Figure 6:
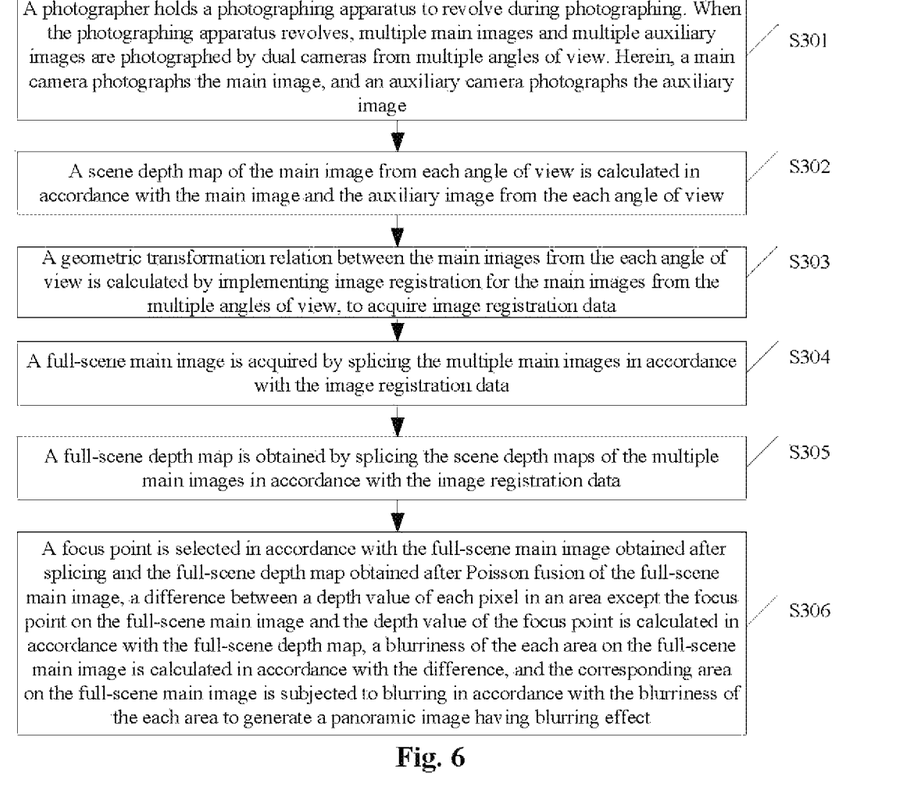
FIG. 6 is a flowchart of a second complete embodiment solution of a panoramic image blurring method according to an embodiment of the disclosure.

In the embodiments of the disclosure, a second complete embodiment solution of the mentioned panoramic image blurring method is shown below. As shown in FIG. 6, the panoramic image blurring method includes steps S301-S306.

S301, a photographer holds a photographing apparatus to revolve during photographing. When the photographing apparatus revolves, multiple main images and multiple auxiliary images are photographed by dual cameras from multiple angles of view. Herein, a main camera photographs the main image, and an auxiliary camera photographs the auxiliary image.

S302, a scene depth map of the main image from each angle of view is calculated in accordance with the main image and the auxiliary image from the each angle of view.

S303, a geometric transformation relation between the main images from the each angle of view is calculated by implementing image registration for the main images from the multiple angles of view, to acquire image registration data.

S304, a full-scene main image is acquired by splicing the multiple main images in accordance with the image registration data.

S305, a full-scene depth map is obtained by splicing the scene depth maps of the multiple main images in accordance with the image registration data.

S306, a focus point is selected in accordance with the full-scene main image and the full-scene depth map obtained after splicing, a difference between a depth value of each pixel in an area except the focus point on the full-scene main image and the depth value of the focus point is calculated in accordance with the full-scene depth map, a blurriness of the each area on the full-scene main image is calculated in accordance with the difference, and the corresponding area on the full-scene main image is subjected to blurring in accordance with the blurriness of the each area, to generate a panoramic image having blurring effect.

In the embodiments of the disclosure, the multiple main images and the multiple auxiliary images from multiple angles in the current scene are acquired by the dual cameras, and the wide-viewing angle full-scene main image and the full-scene depth map are spliced in accordance with the multiple main images, the multiple auxiliary images and the panoramic stitching technology. In this way, the panoramic image having the blurring effect with wide viewing angle, clear main part, and blurry background is generated, an effect of simulating large-aperture imaging of a professional camera is achieved, and a better impression of a photo may be brought.

Figure 7:
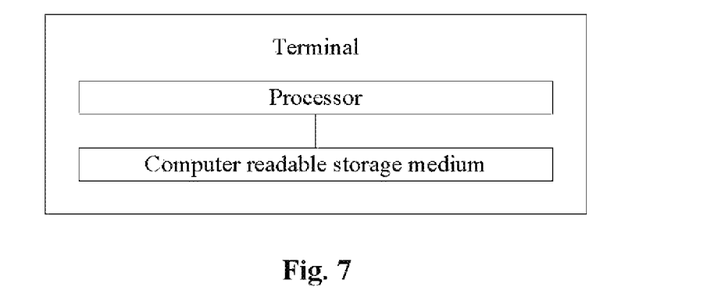
FIG. 7 is a structure diagram of a terminal according to an embodiment of the disclosure.

A terminal, as shown in FIG. 7, includes a processor and a computer readable storage medium. Instructions are stored in the computer readable storage medium. The mentioned panoramic image blurring method is implemented when the instructions are executed by the processor.

A computer readable storage medium is characterized in that a computer program is stored thereon. The mentioned panoramic image blurring method is implemented when the computer program is executed by the processor.

The embodiments of the disclosure includes: the scene depth information of the multiple main images are calculated in accordance with the multiple main images and the multiple auxiliary images which are photographed by the dual cameras from multiple angles of view. The image registration data is calculated in accordance with the multiple main images, and the scene depth information of the each main image is acquired. The full-scene main image is acquired by splicing the multiple main images in accordance with the image registration data, and the scene depth information of the full-scene main image is determined in accordance with the image registration data and the scene depth information of the each main image. The full-scene main image is subjected to blurring in accordance with the scene depth information of the full-scene main image and the selected focus point, to obtain the panoramic image having the blurring effect. Through the solutions in the embodiment, the panoramic image having the blurring effect is acquired.

Although a mode of implementation disclosed by the embodiments of the disclosure is shown as above, the mentioned contents are only the mode of implementation which facilitates understanding of the disclosure and not intended to limit the embodiments of the disclosure. Any of those skilled in the art of the embodiments of the disclosure may make any modifications and changes in terms of form and details of implementation, without departing from the spirit and the scope disclosed by the embodiments of the disclosure. However, as for the scope of patent protection of the embodiments of the disclosure, the scope defined by attached claims shall still prevail.

What is claimed is:

1. A panoramic image blurring method, comprising:
    calculating scene depth information of multiple main images in accordance with the multiple main images and multiple auxiliary images which are photographed by dual cameras from multiple angles of view;
    calculating image registration data in accordance with the multiple main images, and acquiring the scene depth information of the each main image;
    acquiring a full-scene main image by splicing the multiple main images in accordance with the image registration data; determining the scene depth information of the full-scene main image in accordance with the image registration data and the scene depth information of the each main image; and
    implementing blurring for the full-scene main image in accordance with the scene depth information of the full-scene main image and a selected focus point to obtain a panoramic image having blurring effect.

2. The panoramic image blurring method as claimed in claim 1, wherein the scene depth information of the multiple main images is indicated with multiple scene depth maps;
    determining the scene depth information of the full-scene main image in accordance with the image registration data and the scene depth information of the each main image comprises:
    acquiring a full-scene depth map by splicing the scene depth maps of the multiple main images or splicing gradient maps of the scene depth maps of the main images in accordance with the image registration data; and taking the full-scene depth map as the scene depth information of the full-scene main image.

3. The panoramic image blurring method as claimed in claim 2, wherein acquiring the full-scene depth map by splicing the gradient maps of the scene depth maps of the main images comprises:
    acquiring a full-scene depth gradient map by splicing the gradient maps of the scene depth maps of the main images from the multiple angles of view in accordance with the image registration data, and acquiring the full-scene depth map in accordance with the full-scene depth gradient map, wherein the gradient map of the scene depth map of the main image from the each angle of view is acquired by calculating in accordance with the scene depth map of the corresponding main image.

4. The panoramic image blurring method as claimed in claim 3, wherein acquiring the full-scene depth map in accordance with the full-scene depth gradient map comprises: acquiring the full-scene depth map through a preset Poisson fusion constraint equation.

5. The method for blurring panoramic image as claimed in claim 4, wherein implementing the blurring for the full-scene main image in accordance with the scene depth information of the full-scene main image and the selected focus point to obtain the panoramic image having the blurring effect comprises:
    calculating a difference between a depth value of each pixel in an area except the focus point on the full-scene main image and a depth value of the focus point in accordance with the full-scene depth map;
    calculating a blurriness of the each area on the full-scene main image in accordance with the difference; and
    implementing the blurring for the corresponding area on the full-scene main image in accordance with the blurriness of the each area, to generate the panoramic image having the blurring effect.

6. The method for blurring panoramic image as claimed in claim 4, wherein the dual cameras comprise a main camera and an auxiliary camera;
    the method further comprises: from the each angle of view, photographing, by the main camera, the main image; and photographing, by the auxiliary camera, the auxiliary image.

7. The method for blurring panoramic image as claimed in claim 3, wherein implementing the blurring for the full-scene main image in accordance with the scene depth information of the full-scene main image and the selected focus point to obtain the panoramic image having the blurring effect comprises:
    calculating a difference between a depth value of each pixel in an area except the focus point on the full-scene main image and a depth value of the focus point in accordance with the full-scene depth map;
    calculating a blurriness of the each area on the full-scene main image in accordance with the difference; and
    implementing the blurring for the corresponding area on the full-scene main image in accordance with the blurriness of the each area, to generate the panoramic image having the blurring effect.

8. The method for blurring panoramic image as claimed in claim 3, wherein the dual cameras comprise a main camera and an auxiliary camera;
    the method further comprises: from the each angle of view, photographing, by the main camera, the main image; and photographing, by the auxiliary camera, the auxiliary image.

9. The panoramic image blurring method as claimed in claim 2, wherein implementing the blurring for the full-scene main image in accordance with the scene depth information of the full-scene main image and the selected focus point to obtain the panoramic image having the blurring effect comprises:
    calculating a difference between a depth value of each pixel in an area except the focus point on the full-scene main image and a depth value of the focus point in accordance with the full-scene depth map;
    calculating a blurriness of the each area on the full-scene main image in accordance with the difference; and
    implementing the blurring for the corresponding area on the full-scene main image in accordance with the blurriness of the each area, to generate the panoramic image having the blurring effect.

10. The panoramic image blurring method as claimed in claim 9, further comprising: selecting the focus point on the full-scene main image through any one of the following ways:
    determining the focus point through manual selection of a user;

detecting a human face by making use of a human face detection technology, and taking a location of the human face as the focus point; and calculating a target that a human eye is interested in by making use of a visual saliency detection algorithm, and taking a location of the target that the human eye is interested in as the focus point.

11. The method for blurring panoramic image as claimed in claim 2, wherein the dual cameras comprise a main camera and an auxiliary camera;

the method further comprises: from the each angle of view, photographing, by the main camera, the main image; and photographing, by the auxiliary camera, the auxiliary image.

12. The panoramic image blurring method as claimed in claim 1, wherein calculating the image registration data in accordance with the multiple main images comprises:

extracting an invariant feature point of the main image from the each angle of view;

matching the invariant feature points of the main images from different angles of view;

calculating a geometric transformation matrix of the main image from the each angle of view by making use of the invariant feature points that match with each other; and taking the geometric transformation matrix as the image registration data.

13. The method for blurring panoramic image as claimed in claim 12, wherein the dual cameras comprise a main camera and an auxiliary camera;

the method further comprises: from the each angle of view, photographing, by the main camera, the main image; and photographing, by the auxiliary camera, the auxiliary image.

14. The panoramic image blurring method as claimed in claim 1, wherein the dual cameras comprise a main camera and an auxiliary camera;

the method further comprises: from the each angle of view, photographing, by the main camera, the main image; and photographing, by the auxiliary camera, the auxiliary image.

15. A terminal, comprising a processor and a computer readable storage medium; instructions are stored on a non-transitory computer-readable medium, wherein the panoramic image blurring method as claimed in claim 1 is implemented in a case that the instructions are executed by the processor.

16. A computer readable storage medium, on which a computer program is stored on a non-transitory computer-readable medium, wherein the panoramic image blurring method as claimed in claim 1 is implemented in a case that the computer program is executed by the processor.

* * * * *